United States Patent [19]
Mertz

[11] Patent Number: 5,995,071
[45] Date of Patent: Nov. 30, 1999

[54] REFLECTIVE DISPLAY UTILIZING FRESNEL MICRO-REFLECTORS

[75] Inventor: Pierre H. Mertz, Mountain View, Calif.

[73] Assignee: Hewlett-Packard Company, Palo Alto, Calif.

[21] Appl. No.: 08/976,099

[22] Filed: Nov. 21, 1997

[51] Int. Cl.⁶ ................................................. G02F 1/133
[52] U.S. Cl. .............................. 345/84; 345/48; 349/63; 349/96; 349/99; 349/113; 359/267; 359/742
[58] Field of Search .................................. 349/96, 98, 99, 349/102, 103, 113, 114, 57, 61, 63; 359/267, 742; 345/48, 84

[56] References Cited

U.S. PATENT DOCUMENTS

| | | | |
|---|---|---|---|
| 4,298,249 | 11/1981 | Gloor et al. | 349/113 |
| 5,182,663 | 1/1993 | Jones | 349/113 |
| 5,414,544 | 5/1995 | Aoyagi et al. | 359/53 |
| 5,506,705 | 4/1996 | Yamamoto et al. | 359/40 |
| 5,608,550 | 3/1997 | Epstein et al. | 349/57 |

FOREIGN PATENT DOCUMENTS

| | | | |
|---|---|---|---|
| 3537369 A1 | 4/1987 | Germany | G02F 1/133 |

*Primary Examiner*—Bipin H. Shalwala
*Assistant Examiner*—Vincent E. Kovalick

[57] ABSTRACT

A display adapted for use in head mounted display systems. The display includes an array of reflecting pixels, a first light source for illuminating the array of reflecting pixels, and a mask screen located between the light source and the array of reflecting pixels. The mask screen includes a plurality of mask elements, one mask element corresponding to each of the pixels. The mask elements have a first state in which the mask element is transparent and a second state in which the mask element is opaque. The state of the mask element is determined by a potential generated by the corresponding pixel. Each of the pixels includes a reflector for reflecting light from the first light source into a cone having an opening angle and an axis which depends on the position of the pixel in the display and on the telecentricity of the imaging optic. In the preferred embodiment of the present invention, each of the reflectors is an off-axis portion of a diffractive micro Fresnel mirror. A color display is implemented by including additional light sources having wavelengths different from the first light source. The additional light sources are spatially displaced from the first light source and each other to provide proper color mixing.

8 Claims, 5 Drawing Sheets

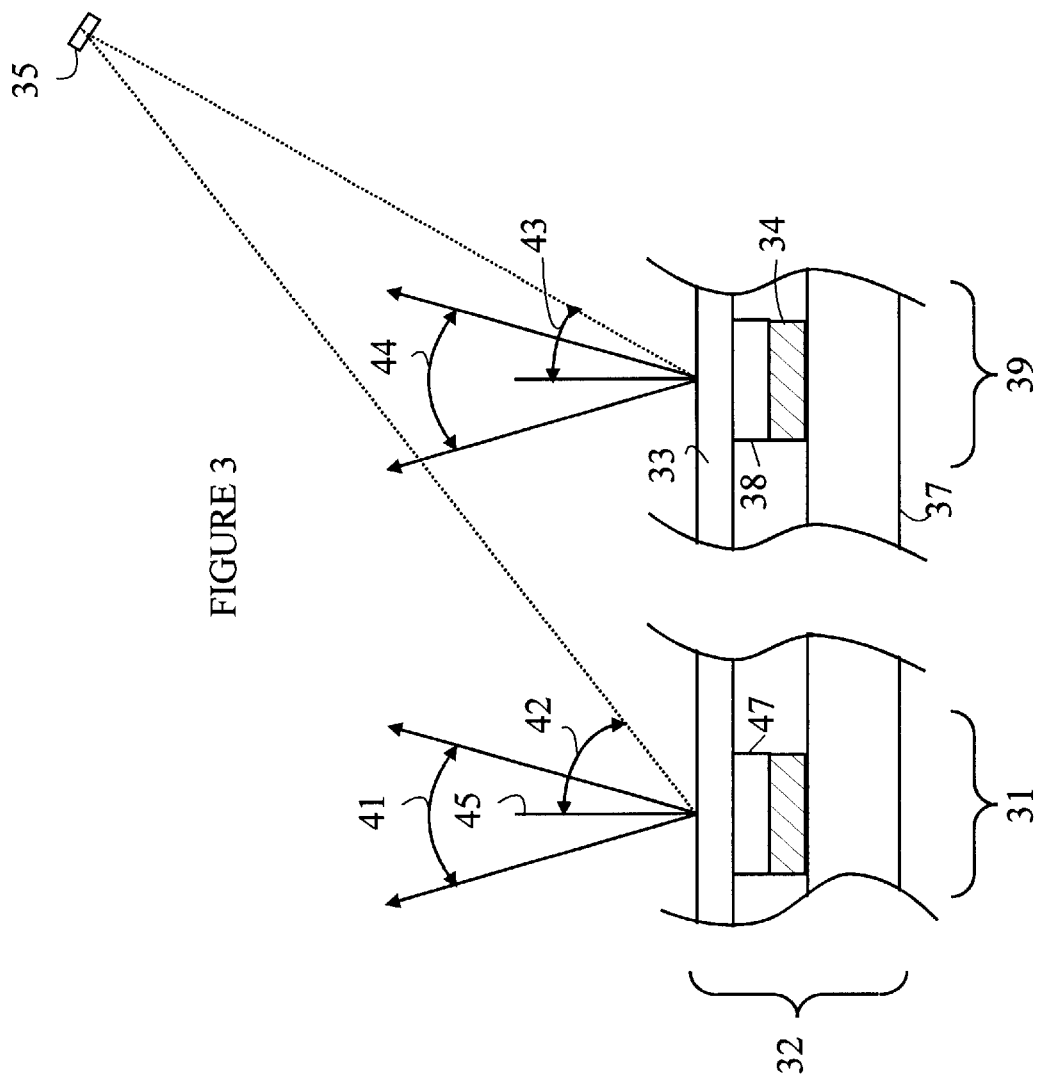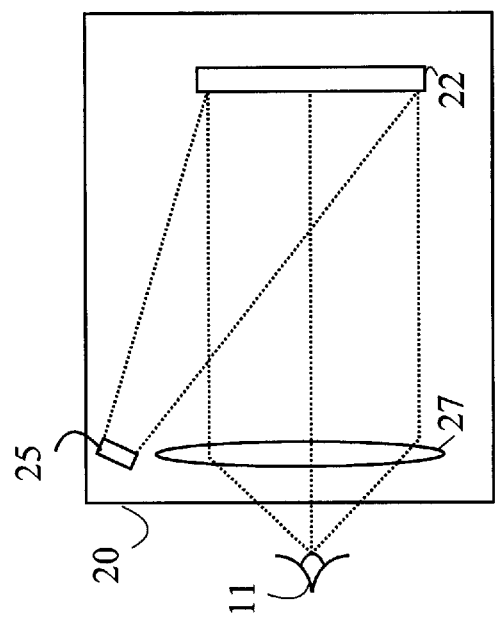

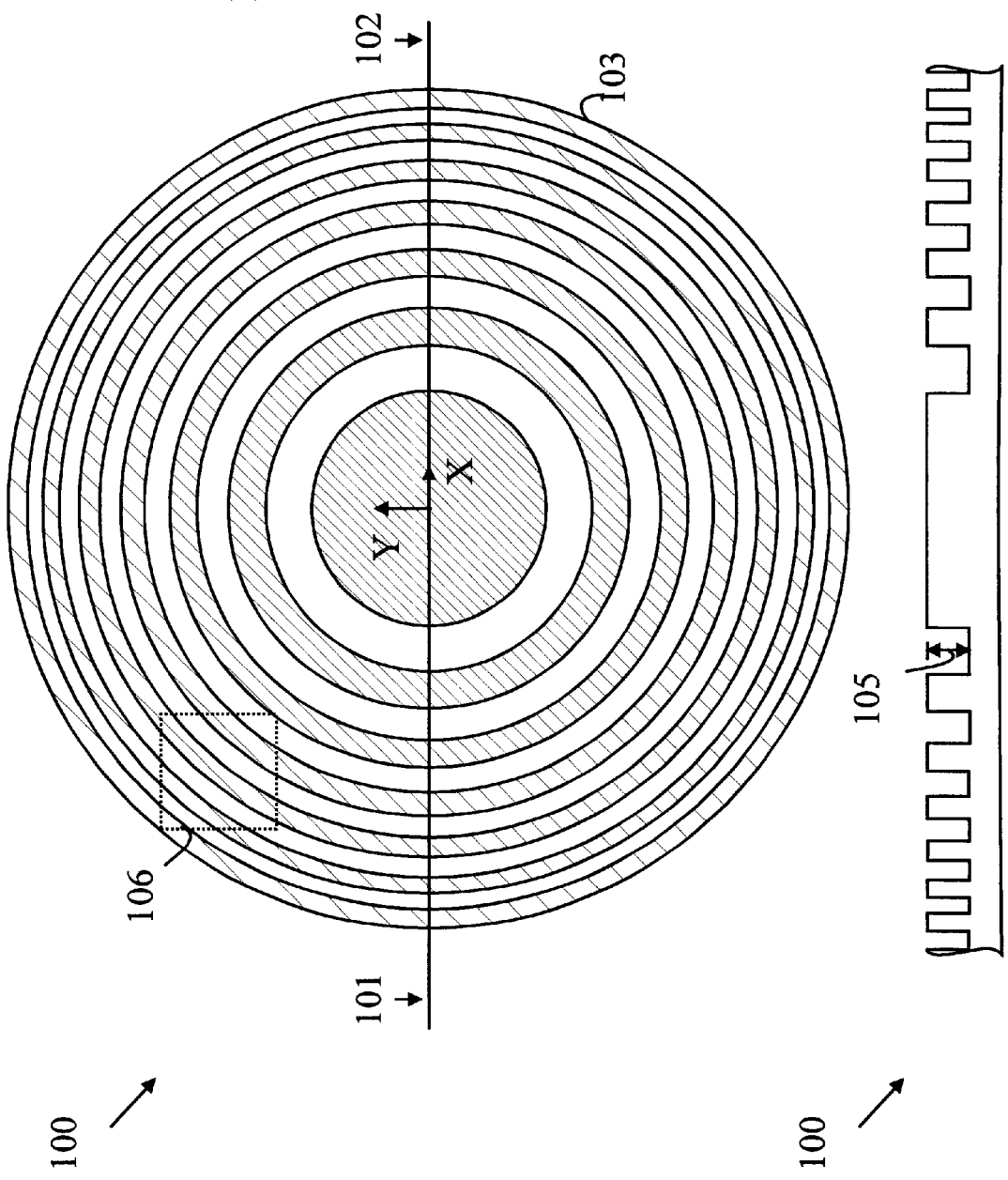

REFLECTIVE DISPLAY UTILIZING FRESNEL MICRO-REFLECTORS

FIELD OF THE INVENTION

The present invention relates to display systems, and more particularly, to the illumination of display systems in which a plurality of pixels generate an image by reflecting light from one or more light sources.

BACKGROUND OF THE INVENTION

To simplify the following discussion, the present invention will be discussed in terms of displays utilized in head mounted computer displays; however, it will be apparent to those skilled in the art from the following discussion that the present invention may be applied to other types of displays. Head-mounted computer displays may be viewed as "eye glasses" that are worn by the user to view images created by a computer. The image seen by each eye is generated on a display screen having a two dimensional array of pixels.

In one type of display, each pixel is a small mirror that is covered by a "shutter" that is controlled by the voltage of the mirror. The shutter is constructed from a layer of liquid crystal on the mirrors. The voltage controls the state of the liquid crystal on top of the pixel so as to modulate the reflected light. A light source illuminates the pixels and the modulated reflected light from the pixels is imaged into the eye of the viewer. The imaging optics typically consist of lenses which magnify the pixels and form a virtual image. The light source is typically constructed from 3 LEDs that emit different colors.

For this type of display to function properly, the intensity of light reflected by each micro-mirror must be independent of the pixels location in the display. In addition, each pixel must appear to be an independent light source. In prior art systems, these constraints are met by converting the three point light sources into a diffuse light beam which strikes the display at right angles to the plane of the mirrors. The light source utilizes a condenser lens to collimate or slightly diverge the light to match the diffuser or telecentricity of the imaging optic and an array of micro-lenses in the collimated light beam to provide the required diffusion. Since the light source must be outside the field of view of the user so as not to block the image generated by the display, a half silvered mirror is used to illuminate the display while allowing light reflected by the display to reach the eye of the viewer.

This prior art solution to the illumination problem has several problems. First, the distance between the first imaging optic and the display must be at least as great as the shortest dimension of the display to provide room for the half-silvered mirror. Second, the illuminator requires a condenser lens and diffuser which must be at least as large as the display. These constraints lead to a bulky display. Both the size and the weight of this type of display are objectionable.

To collimate the light source, all of the LEDs must be very close to the focal point of the collimating lens and limited in size so as to simulate a single point source and properly mix the colors of the LEDs. This constraint limits the size of the LEDs, and hence, the maximum intensity of light from the display. In addition, the half-silvered mirror decreases the brightness of the display, since only one fourth of the light in the collimated beam actually reaches the viewer's eye.

Broadly, it is the object of the present invention to provide an improved illumination system for a reflective display.

It is a further object of the present invention to provide a display system that does not require the use of a half-silvered mirror to illuminate the pixels.

It is a still further object of the present invention to provide a display system that can utilize spatially separate color LEDs or other non-point light sources to provide increased image intensity, while still providing good color mixing.

It is yet another object of the present invention to provide a display system that does not require the use of a condenser lens nor a diffuser between the light source and the display.

These and other objects of the present invention will become apparent to those skilled in the art from the following detailed description of the invention and the accompanying drawings.

SUMMARY OF THE INVENTION

The present invention is an illumination system for a reflective display adapted for use in head mounted display systems and the like. The display includes an array of reflecting pixels, a light source for illuminating the array of reflecting pixels, and a mask screen located between the light source and the array of reflecting pixels. The mask screen includes a plurality of mask elements, one mask element corresponding to each of the pixels. The mask elements have a first state in which the mask element is transparent and a second state in which the mask element is opaque. The state of the mask element is determined by a potential generated by the corresponding pixel. Each of the pixels includes a reflector for reflecting light from the light source into a cone having an opening angle and an axis which depends on the position of the pixel in the display and on the telecentricity of the imaging optic. In the preferred embodiment of the present invention, each of the reflectors is an off-axis portion of a diffractive micro Fresnel mirror. A color display is implemented by including additional light sources having wavelengths different from the first light source. The additional light sources are spatially displaced from the first light source, and each other to provide proper color mixing.

BRIEF DESCRIPTION OF THE DRAWINGS

FIG. 2 is a cross-sectional view of a display system according to the present invention.

FIG. 3 is a cross-sectional view of a portion of a monochromatic display according to the present invention.

FIG. 4 is a top view of a micro Fresnel mirror that may be used to implement the present invention.

FIG. 5 is a cross-sectional view of the micro Fresnel mirror shown in FIG. 4.

DETAILED DESCRIPTION OF THE INVENTION

Figure 1:
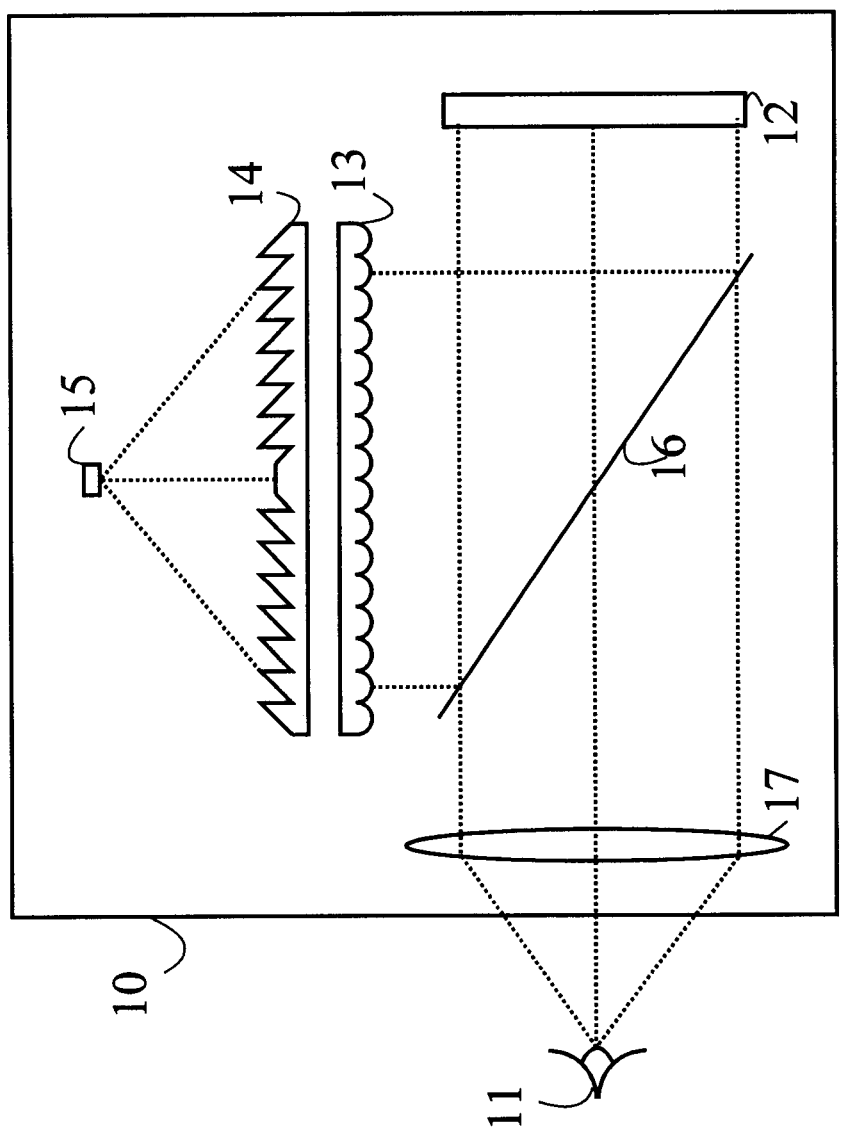
FIG. 1 is a cross-sectional view of a prior art display system.

The present invention may be more easily understood with reference to FIG. 1 which is a cross-sectional view of the prior art display system 10 discussed above. A display screen 12 is illuminated by a light source consisting of an LED 15 close to the focal point of a Fresnel lens 14. The collimated, or slightly diverging, light leaving Fresnel lens 14 is diffused by a diffuser or micro-lens array 13 to match the telecentricity of the imaging optic. The light from the source is reflected from a half-silvered mirror 16 onto display 12. The light reflected back by display 12 is imaged by lens 17 into the eye 11 of the user. It should be noted that, at most, half of the light leaving diffuser 13 reaches display 12, since mirror 16 allows half of the light to pass through the mirror. Similarly, only half of the light leaving display 12 reaches lens 17 for the same reason. It should also be noted that the minimum values for the width and height of the display system are set by the illumination optics. As noted above, such systems are bulky and have limitations on the maximum light intensity that can be delivered to the eye of the viewer.

Refer now to FIG. 2 which is a cross-sectional view of a display system 20 according to the present invention. Display system 20 utilizes a novel display 22 which is illuminated via an off-axis light source 25. As will be explained in detail below, the pixels of display 22 have individual micro-reflectors which correct for the off-axis illumination and provide the diffusion needed to generate an image via lens 27.

The manner in which the individual micro-reflectors are constructed in the preferred embodiment of the present invention will now be explained in more detail with reference to FIG. 3 which is a cross-sectional view of a portion of a display 32 according to the present invention. FIG. 3 shows two pixels, 31 and 39, which are constructed on a substrate 37 which includes the circuitry for driving the pixels. To simplify the figure, the circuitry and the connections thereto have been omitted from FIG. 3. Each pixel includes an electrode 34 which modulates the state of an LCD screen 33 above the electrode when power is applied to the electrode. In one state the LCD screen above the pixel is transparent; in the other it is opaque. The LCD screen is equivalent to a masking array having one mask element per pixel which is modulated by that pixel. Each pixel also includes a micro-reflector as described above. The micro-reflectors corresponding to pixels 31 and 39 are shown at 47 and 38, respectively. The micro-reflectors are constructed from an electrically conducting material so that the potential on the corresponding electrode is transferred through the micro-reflector to the LCD screen.

Each of the micro-reflectors is an off-axis portion of a micro Fresnel mirror. The specific portion chosen depends on the position of the micro-reflector relative to the light source 35. The portion is chosen such that light from source 35 is diffracted in a direction normal or slightly off-axis to match the telecentricity of the imaging optics at that pixel to the surface of the display as shown at 45. The diffracted light remains within a cone having an opening angle which is the same for all pixels regardless of the pixels position in the display. That is, angles 41 and 44 are the same even though angles 42 and 43 are different.

The micro Fresnel mirror is preferably constructed as a plurality of rings on a flat background as illustrated in FIGS. 4 and 5. FIG. 4 is a top view of a portion of a Fresnel mirror 100 and FIG. 5 is a cross-sectional view of lens 100 through line 101–102. Lens 100 may be viewed as a plurality of rings 103 having a constant height 105. The height of the rings is a quarter of the center wavelength of the light from the light source in the liquid crystal medium. In this described embodiment, the micro-Fresnel lens contains two binary steps, however, more discrete steps, or even analog steps, i.e., blazes having non-flat tops, could be used to increase the diffraction efficiency.

Each of the micro-reflectors corresponds to an off-axis portion of lens 100. The portion of mirror 100 used for an exemplary micro-reflector is shown at 106. The position of the micro-reflector relative to the center of the Fresnel mirror may be specified in terms of the Cartesian coordinates of the center of the micro-reflector relative to an XY-coordinate system having its origin at the center of the mirror.

The manner in which the XY coordinates for each micro-reflector relative to the center of the Fresnel mirror and the rings specifying the Fresnel mirror are determined will now be discussed in more detail. The micro-reflector for each pixel will, in general, be different from that used for any other pixel in the display.

The position of the LED supplying the illumination and the pixel are assumed to be fixed. Hence, the problem may be viewed as determining the location of the center of the Fresnel mirror from which the micro-reflector is "cut" relative to the pixel or the LED.

The Fresnel mirror is characterized by a focal length which is related to the angular opening of the cone into which the light from each pixel is to be diffused. Each micro-reflector will be assumed to be a square having a side equal to D. The focal length of the micro-reflector is defined by $$f = \frac{D}{2}\cot(\varphi/2) \quad (1)$$

where $\phi$ is the cone angle into which the display pixel defined by the micro-reflector is to diffuse. Referring to FIG. 3, it will be apparent that $\phi$ is equal to angle 41 (or 44) shown therein. The off-axis portion of this micro-reflector is chosen for each pixel such that the center of the pixel images the light source as a virtual light source a given distance behind the display. This distance should match the telecentricity of the imaging optics. The centers of the pixels thus act together to form a larger off-axis mirror of focal length, F=(T+H)/TH, where T is the distance to the virtual source and H is the distance to the real source.

It can be shown that the Fresnel mirror reflects light as if it was a circularly symmetric reflector having a height, z, at a radius, r, given by $$z(r) = 0.5\sqrt{f^2 + r^2} - f \quad (2)$$

Figure 6:
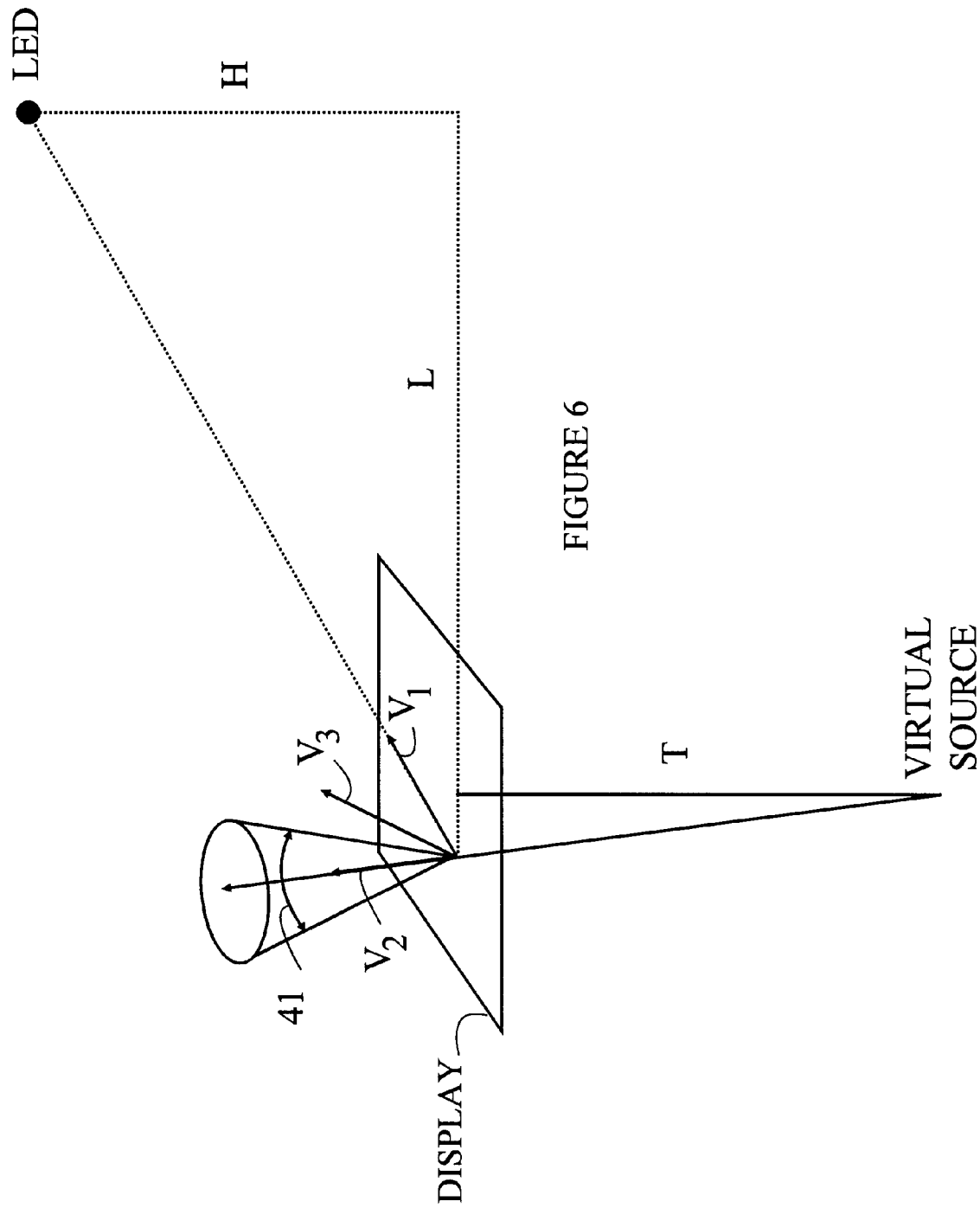
FIG. 6 illustrates the vectors used in computing the properties of the micro Fresnel lens corresponding to each pixel.

Once the focal length of the Fresnel mirror is set and the position of the LED defined with respect to center of the mirror, the light from the LED will appear to originate from a virtual source behind the mirror. To simplify the following discussion, three vectors will be defined with respect to each pixel. These vectors are shown in FIG. 6. Define $V_1$ to be a vector of unit length from the pixel to the light source, and define $V_2$ to be a vector of unit length in a direction from the virtual source to the center of the pixel. The distance of the virtual light source from the display controls the telecentricity of the display, and should be matched to the imaging optics. $V_3$ is defined to be the vector sum of $V_1$ and $V_2$. The position of the Fresnel mirror relative to the light source and the pixel is set by the requirement that $V_3$ be equal to the normal to the surface defined by Eq.(2).

In the following discussion, it will be assumed that a three-dimensional Cartesian coordinate system is defined such that the light source is located above the mirror along the y-axis, i.e., at a coordinate of the form (0, L, H), and the virtual source is located on the z-axis, i.e., at a coordinate of the form (0, 0, –T). With these definitions, it can be shown that the center of the pixel must be placed at (x, y, 0) where $$x = 2fV_{Mx} / \sqrt{1 - 4V_{Mx}^2 - 4V_{My}^2} \quad (3)$$

and $$y = 2fV_{My} / \sqrt{1 - 4V_{Mx}^2 - 4V_{My}^2} \quad (4)$$

where $$V_{Mx} = \frac{-V_{3x}}{V_{3z}} \quad (5)$$

and $$V_{My} = \frac{-V_{3y}}{V_{3z}} \quad (6)$$

The ring pattern of the Fresnel mirror is specified by a radial height function $$r(m) = \sqrt{2m\lambda f + (m\lambda)^2} \quad (7)$$

where a ring is raised if m is between an integer and half integer. Here, λ is the mean wavelength of the light source. The height of the raised portion of the mirror is λ/(4n) where n is the index of refraction of the liquid crystal medium.

Figure 7:
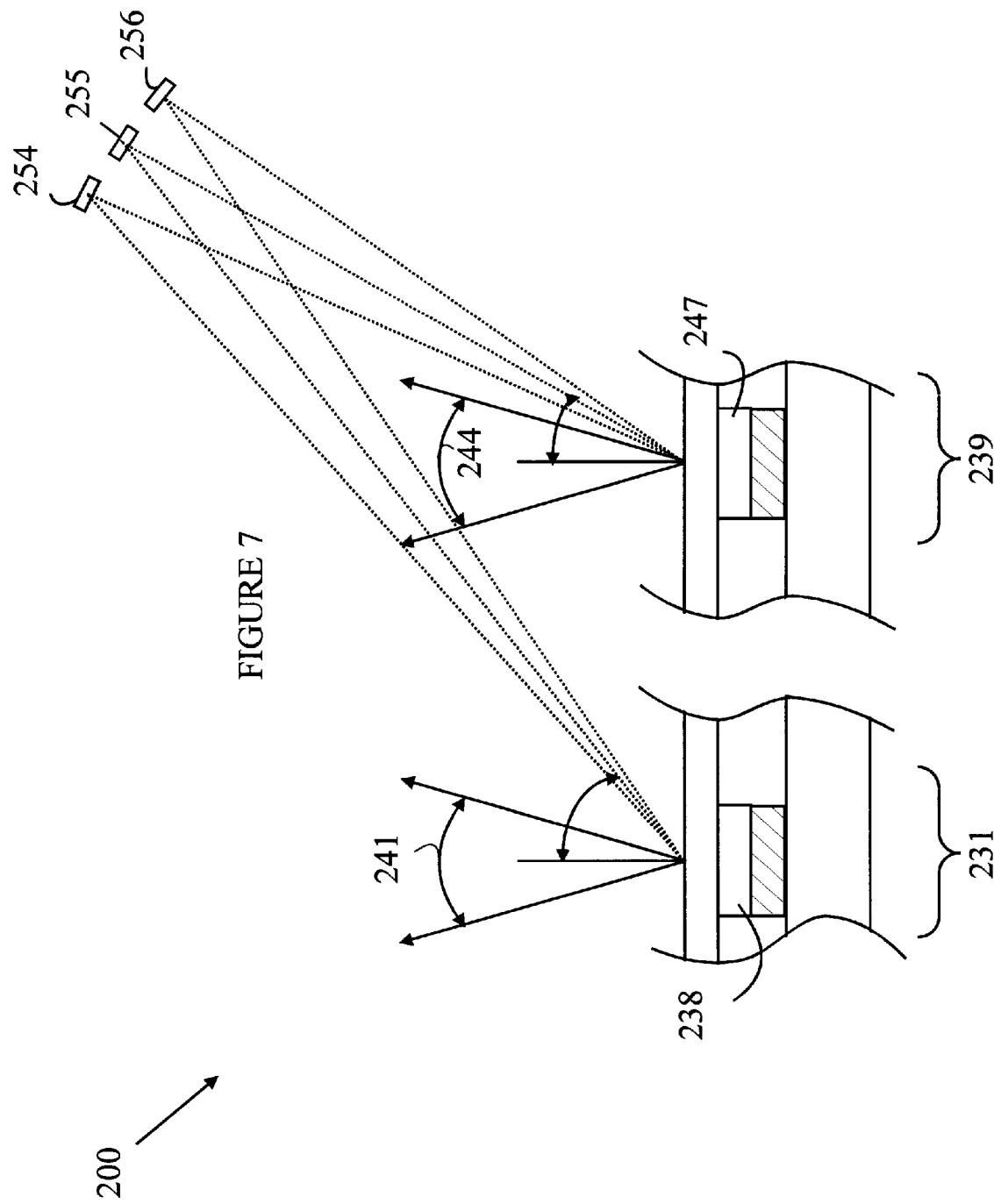
FIG. 7 is a cross-sectional view of a portion of a color display according to the present invention.

Refer now to FIG. 7 which is a cross-sectional view of a portion of a color display 200 according to the present invention which utilizes a plurality of light sources. It should be noted that the above ring pattern and placement is for a single wavelength. In color displays, three sources having different wavelengths (i.e., red green and blue, shown at 254–256, respectively) are typically used. FIG. 7 illustrates two pixels 231 and 239 which are separated from one another on the display. Consider the case in which the micro-reflector parameters are determined with respect to green source 255. The micro-reflectors 238 and 247 are designed to reflect light from source 255 into cones 241 and 244. However, since the parameters depend on the wavelength of the light source, light from a red or blue source placed at the same location will not be reflected into cones 241 and 244.

However, to provide proper color mixing, the micro-reflector must also reflect the light from the other two sources into the same diffusion cone about the same normal to the pixel. It can be shown that this condition can be met if the other sources are displaced with respect to the source for which the micro-reflector parameters were computed using the green source. The offset of the other sources can be computed solving the above equations for vector $V_1$ utilizing the x, y, and f parameters computed for the center frequency.

The fact that the three light sources are offset from one another provides the present invention with a significant advantage over the prior art systems described above in which the three sources must be located at the focal point of a lens. As noted above, such systems require "point" sources placed close together to approximate a single point source. This limits the area, and hence, intensity of the light sources. The present invention, in contrast, assumes three point sources that are separated from one another. Hence, the LEDs do not need to be packed together to approximate a point source. Accordingly, more extended sources that are spaced apart from one another may be used, thereby providing both higher intensity and better light mixing.

In the preferred embodiment of the present invention, the micro-reflectors are constructed by utilizing the reflector as the electrode corresponding to each pixel (i.e., electrode 34 shown in FIG. 3). To provide high reflectivity, a metallic material such as aluminum is preferred; however, patterning rings in a layer of aluminum is difficult. To avoid these difficulties, the present invention utilizes a layer of SiN having a thickness equal to λ/4 in the liquid crystal on top of an Al layer. A ring pattern is etched through the SiN using conventional integrated circuit processing techniques. The resulting etched ring pattern is then coated with aluminum to provide the required reflectivity. The connection between the top Al and bottom Al layers in the etched regions provides the electrical connections to the underlying circuitry constructed in the silicon substrate.

Various modifications to the present invention will become apparent to those skilled in the art from the foregoing description and accompanying drawings. Accordingly, the present invention is to be limited solely by the scope of the following claims.

What is claimed is:

1. A display comprising:

an array of reflecting pixels;

a first light source which is off-axis for illuminating said array of reflecting pixels; and a mask screen located between said light source and said array of reflecting pixels, said mask screen comprising a plurality of mask elements, one mask element corresponding to each of said pixels, said mask elements having a first state in which said mask element is transparent and a second state in which said mask element is opaque, said state of said mask element being determined by a potential generated by said pixel corresponding to that mask element, wherein each of said pixels comprises a reflector for reflecting light from said first light source into a cone having an opening angle and an axis which depends on the position of the pixel in the display and on the telecentricity of the imaging optic.

2. The display of claim 1 wherein one of said reflectors comprises an off-axis portion of a micro Fresnel mirror.

3. The display of claim 2 wherein said micro Fresnel mirror comprises a zone plate comprising a plurality of circular rings of first height.

4. The display of claim 3 wherein said micro Fresnel mirror further comprise a plurality of rings of a second height.

5. The display of claim 2 wherein each of said reflectors is an electrical conductor and is in electrical contact with said mask element corresponding to said pixel containing that reflector and wherein said potential is connected to said mask element by electrical conduction through that reflector.

6. The display of claim 3 wherein said mask array comprises an LCD screen and wherein said first height is a quarter of the center wavelength of the light generated by said light source in said liquid crystal.

7. The display of claim 1 further comprising a second light source having a wavelength different from that of said first light source, said reflectors reflecting light from said second light source into the same cone as said light from said first light source.

8. The display of claim 7 wherein said first light source is spatially separated from said second light source.

* * * * *